H. S. BUSBY.
NON-SIDE-DRAFT PLOW HITCH.
APPLICATION FILED JUNE 11, 1910.

987,045.

Patented Mar. 14, 1911.
2 SHEETS—SHEET 1.

Witnesses

Inventor
H. S. Busby.

By

Attorney

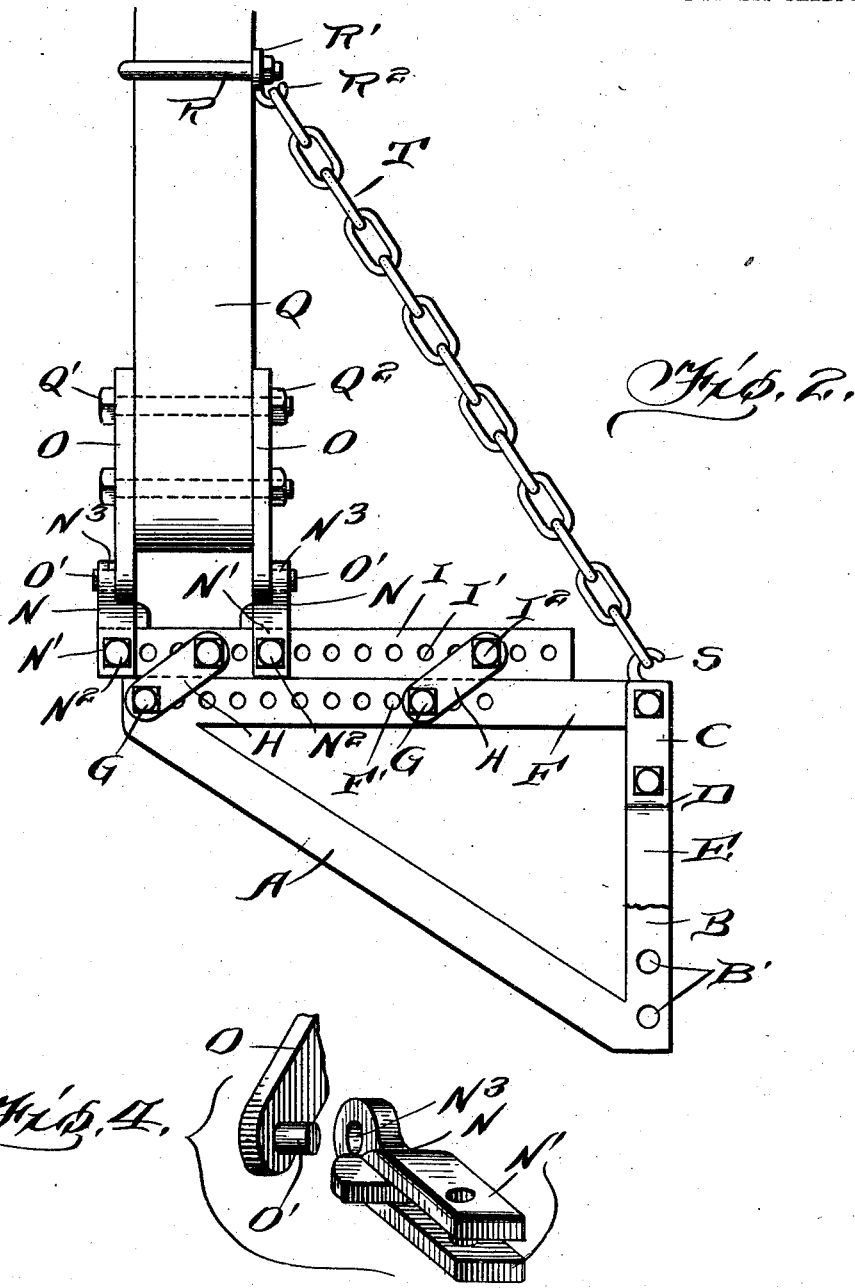

UNITED STATES PATENT OFFICE.

HARLEY S. BUSBY, OF WASHINGTON, IOWA.

NON-SIDE-DRAFT PLOW-HITCH.

987,045.  Specification of Letters Patent.  Patented Mar. 14, 1911.

Application filed June 11, 1910. Serial No. 566,466.

*To all whom it may concern:*

Be it known that I, HARLEY S. BUSBY, a citizen of the United States, residing at Washington, in the county of Washington and State of Iowa, have invented certain new and useful Improvements in Non-Side-Draft Plow-Hitches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in an attachment for plows for preventing side draft and affording a sufficient base room.

The invention comprises various details of construction and combinations and arrangements of parts which will be hereinafter fully described and then specifically defined in the appended claims.

I illustrate my invention in the accompanying drawings in which:—

Figure 1:
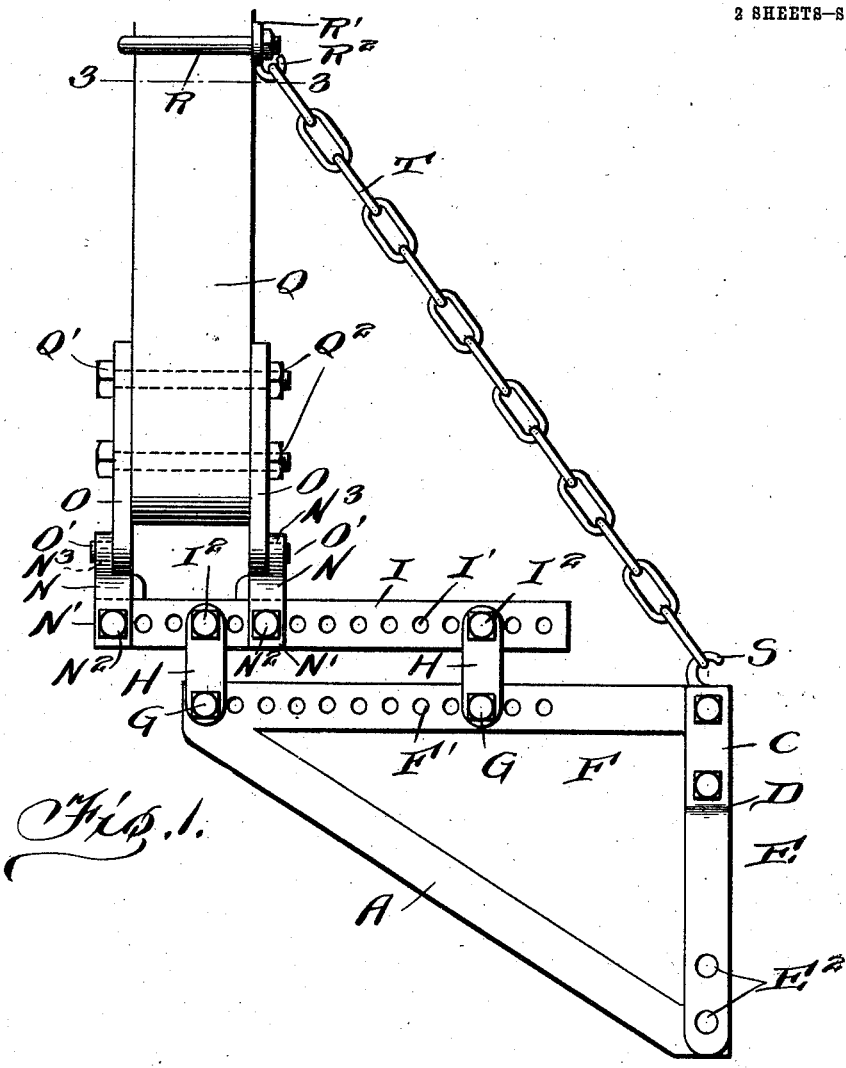
Figure 3:
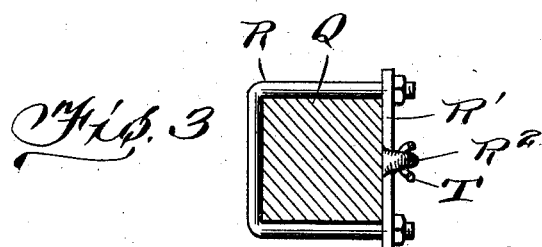

Figure 1 is a top plan view of my invention showing the same attached to the plow beam. Fig. 2 is a similar view showing the parts partly folded or collapsed. Fig. 3 is a sectional view on line 3—3 of Fig. 1, and Fig. 4 is an enlarged detail view of a part of the invention.

Reference now being had to the details of the drawings by letter, A designates a frame which is of general triangular shape and to one of the sides B thereof, which is apertured as at B', is fastened a bar C, bent at right angles at points designated by letters D and D, and the free arm E of said bar is positioned parallel with the side B and has apertures $E^2$ in registration with the apertures B' for the reception of a lag bolt, not shown, to which a double tree may be connected. The side F of said triangular frame is provided with series of perforations F' adapted to receive the bolts G which are passed through certain of said perforations F' and also perforations in the links H.

I designates a bar provided with perforations I' for the reception of bolts $I^2$ which pass through registering apertures in the links H and in the perforations I'.

Shouldered links N are provided with bifurcated ends N' having perforations for the reception of the bolts $N^2$ which pass through registering apertures in the ends of the links and also perforations I, while perforations $N^3$ are formed in the opposite ends of the links N for the reception of the pins O' carried by the bars O which are clamped against the opposite faces of the plow beam Q by means of the bolts Q' having threaded nuts $Q^2$ thereon. Said pins O', which connect the links N with the bars O, allow pivotal movements between the two members thus connected.

Fastened to the plow beam at any suitable location is a U-shaped bolt R which holds a plate R' against the side of the plow beam, said plate R' having an integral hook $R^2$ thereon which engages one end of the chain T, the other end of which chain is adapted to be connected to a hook S which is integral with the bar B.

From the foregoing, it will be noted that, by the provision of a device as shown and described, a hitch is provided which is reversible and may be collapsible and which may be set for any form of plow, either beam, frame, gang or sulky, the size of the perforations allowing for ample adjustment. The chain T connecting the hook S with the beam is adapted to be made in lengths to correspond to the size of the hitch. In order to securely hold the parts from working loose, collar keys are preferably employed.

What I claim to be new is:—

1. An adjustable frame hitch for sulky and gang plows, etc., comprising a triangular-shaped frame, one of the sides of which is provided with series of perforations, a hitch hook at one corner of the frame, a perforated bar, bifurcated links pivotally connected to the latter, connections between said perforated bar and frame, a plow beam, bars fastened to said beam and pivotally connected to eyes in said links, a hook fastened to the plow beam, and a chain connecting said hooks.

2. An adjustable frame hitch for sulky and gang plows, etc., comprising a triangular-shaped frame, one of the sides of which is provided with series of perforations, a perforated bar, pivotal link connections between the latter and the perforated bar of the frame, a hitch hook at one corner of the frame, an angled bar fastened to said frame and provided with apertures which are in registration with apertures in the frame and adapted to receive a whiffle tree connection, bifurcated links adjustably connected to the perforated bar and provided with eyes, a plow beam, bars fastened to the opposite side thereof, pins projecting from said bars which are fastened to the plow beam and pivotally connected to the eyes of said links, a hook fastened to the plow beam, and chain connections between said hooks.

In testimony whereof I hereunto affix my signature in the presence of two witnesses.

HARLEY S. BUSBY.

Witnesses:
C. W. BUSBY,
J. J. KELLOGG.

Copies of this patent may be obtained for five cents each, by addressing the "Commissioner of Patents, Washington, D. C."